United States Patent [19]

Morrison

[11] Patent Number: 4,621,546
[45] Date of Patent: Nov. 11, 1986

[54] MACHINING WORKPIECES

[75] Inventor: William C. Morrison, Kenilworth, England

[73] Assignee: AE PLC, Warwickshire, England

[21] Appl. No.: 703,298

[22] Filed: Feb. 20, 1985

[30] Foreign Application Priority Data

Feb. 20, 1984 [GB] United Kingdom ............... 8404453

[51] Int. Cl.⁴ .................... B23B 1/00; B23B 25/06
[52] U.S. Cl. ............................ 82/1 C; 82/40 R; 82/45
[58] Field of Search .................. 82/1 C, 45, 40 R; 279/1 L, 5

[56] References Cited

U.S. PATENT DOCUMENTS 1,512,586 10/1924 Faunce ................................. 82/45
2,370,503 2/1945 Straw ................................... 82/45
3,901,519 8/1975 Lecailtel et al. .................. 82/40 R

FOREIGN PATENT DOCUMENTS 1575534 7/1977 United Kingdom .

Primary Examiner—Leonidas Vlachos
Attorney, Agent, or Firm—Leydig, Voit & Mayer, Ltd.

[57] ABSTRACT

A workpiece is set up and held on a machining axis to allow machining of the outer surface in a single operation. The workpiece is lightly clamped between a headstock and a tailstock and a datum surface is provided which is a datum distance from the machining axis. An aligning mechanism aligns the surface of the workpiece with the datum surface so ensuring that the workpiece surface is a required distance from the machining axis. The clamping pressure is then increased to hold the workpiece in this position ready for machining in a single operation.

2 Claims, 2 Drawing Figures

MACHINING WORKPIECES

BACKGROUND TO THE INVENTION

1. Field of the Invention

The invention relates to the setting-up of workpieces for machining, such that the workpiece is accurately aligned on a machining axis and is held in such a way as to allow machining of the outer surface thereof in a single operation.

2. Review of the Prior Art

If a workpiece, whose outer surface is to be machined along its axial length, is held in a chuck, it is necessary to machine this surface in two operations. In a first operation, one end of the surface is machined, the workpiece is then removed from the chuck, turned through 180° and the machined surface is inserted in the chuck. Then the remainder of the surface is machined in a second operation. This has the disadvantage that it is a two-operation process, so slowing the production rate and increasing the production cost of workpieces.

In addition, the repositioning of the workpiece will inevitably introduce positioning errors which will, in turn, produce errors in the final surface profile of the workpiece. Thus, the use of a chuck is not practical where a highly accurate profile is required, particularly where, for example, a computer-controlled turning operation is to be performed using a diamond tool, so giving the capability of producing highly accurate complex profiles. This is because the full potential accuracy of the computer control cannot be realised due to chuckpositioning errors.

SUMMARY OF THE INVENTION

According to the invention, there is provided a device for setting-up and holding a workpiece on a machining axis to allow uninterrupted machining of the outer surface thereof in a single operation, comprising a headstock and tailstock assembly defining a machining axis and for clamping the workpiece between the ends thereof, the clamping pressure being variable, a datum surface carried on the headstock and tailstock assembly at a datum distance from the machining axis, and an aligning mechanism positionable to align at least a part of the outer surface of the workpiece with the datum surface so that said at least a part of the outer surface is at a required distance from the machining axis, while the workpiece is clamped between the headstock and the tailstock so as to allow limited radial movement of the workpiece, the aligning mechanism being movable out of the aligning position when such alignment has been achieved, the clamping pressure then being increased to hold the workpiece in the aligned position with the surface thereof free for machining of a single operation.

According to a second aspect of the invention, there is provided a method of setting-up and holding a workpiece on a machining axis to allow machining of an outer surface thereof in a single operation, and comprising clamping the workpiece between the ends thereof such that the workpiece axis is roughly coaxial with a machining axis and so that the workpiece is capable of limited radial movement, aligning at least a part of the outer surface of the workpiece with a datum surface which is at a datum distance from the machining axis so that said at least a part of the outer surface of the workpiece is a required distance from the machining axis, and then increasing the clamping pressure to hold the workpiece in the aligned position with the outer surface thereof free for machining in a single operation.

BRIEF DESCRIPTION OF THE DRAWINGS

The following is a more detailed description of one embodiment of the invention, by way of example, reference being made to the accompanying drawings in which.

DESCRIPTION OF THE PREFERRED EMBODIMENTS

Figure 1:
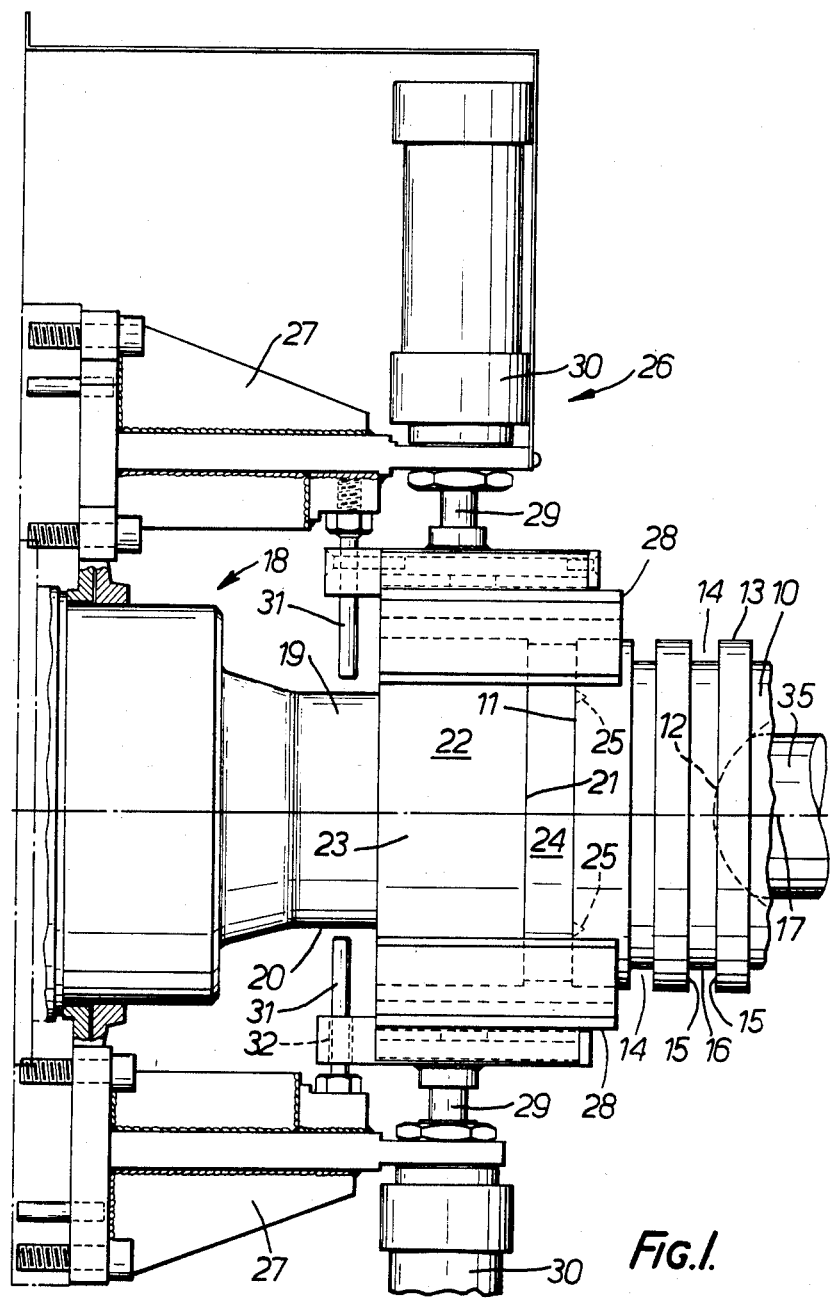
FIG. 1 is a side elevation of a device for setting-up and holding a workpiece in the form of a piston on a machining axis to allow machining of the outer curved surface thereof in a single operation.

A piston blank 10 is cast from a suitable material such as an aluminium or aluminium alloy. The piston 10 may be gravity die cast or be squeeze cast or forged. The piston 10 has a crown end 11, a hollow interior 12, defining the other end of the piston, and an outer cylindrical surface 13.

After casting, the piston 10 is pre-machined so that the outer surface 13 is generally cylindrical and so that a required number, three for example, of piston ring grooves 14 are formed in the surface 13 towards the crown end of the piston. Each piston ring groove 14 has radially extending side walls 15 with an annular base 16. After the piston 10 is pre-machined, it is then finish machined using, for example, a turning lathe having diamond tools. It may be required to turn the surface 13 to be truly cylindrical or it may be required to turn this surface so that it is barrelled and/or of oval cross-section, to ensure that the piston is, in operation, an accurate fit within an associated cylinder or liner. It may additionally or alternatively be desired to machine on the outer cylindrical surface piston features, such as the bearing surfaces described in British Patent Specification No. 2104188.

The finish machining must be done to a very high accuracy and this can only be achieved by performing the finish machining in a single operation, so that it is not possible to clamp one end of the piston in a chuck, machine the other end and then reverse the procedure. In addition, it may be essential that the axis of the pre-machined piston 10 is coaxial with the machining axis 17 (see FIG. 1), because in certain cases the bases 16 of the piston ring grooves 14 are not machined during finish machining and it is necessary for them to be coaxial with the axis of the finish machined piston surface. Plainly, if the finish machining is performed with a machining axis 17 not coaxial with the axis of the pre-machined piston 10, this will not be the case.

Further, where the finish machining is performed by a computer-controlled tool, it is essential that the piston 10 be held in a predetermined datum position which can be fed to the computer control to ensure that the tool commences machining at the correct point on the piston 10. This means not only that the piston axis must be coaxial with the machining axis (so that the curved surface of the piston 10 to be machined is always at the correct radial distance) but also that the piston 10 is correctly positioned in an axial direction for example, by having the crown end 11 of the piston at a particular axial position along the machining axis.

Figure 2:
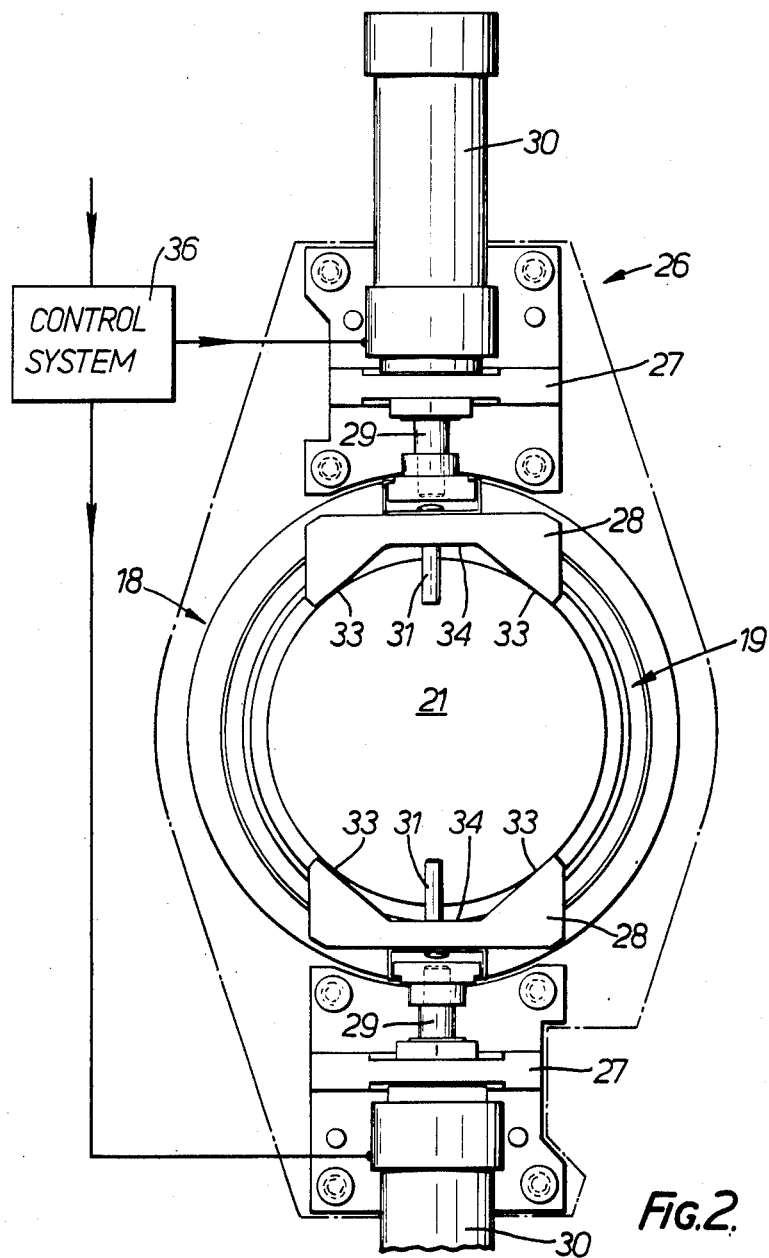
FIG. 2 is an end elevation of the device of FIG. 1, but with the piston, and an annulus of the device, removed for clarity.

The device shown in FIGS. 1 and 2 is for accomplishing this.

Referring to these Figures, the device comprises an assembly of a headstock 18 and a tailstock 35 which can be rotated about a common machining axis 17. The headstock 18 and the tailstock 35 are movable axially towards and away from one another.

The headstock 18 includes a mandrel 19 (FIG. 1) having an outer cylindrical surface 20 and an end surface 21 lying in a plane normal to the machining axis 17. An annulus 22 is removably mounted on the mandrel 19 (for example, by screws) and has an outer datum cylindrical surface 23 which has the same diameter as the diameter of the rough machined piston 10. Because of this mounting, the axis of the annulus 22 is coaxial with the machining axis 17.

A pad 24 is removably connected to the end surface 21 of the mandrel and has an outer diameter which is less than the diameter of the piston 10. This pad 24 has a predetermined axial length between two end faces thereof normal to the machining axis 17, such that the free end face of the pad 24 is at a predetermined axial position. This face is provided with a plurality of spaced sharp projections 25 which are of a harder material than the material of the piston 10.

An aligning mechanism, indicated generally at 26, is mounted on supports 27 carried on the headstock 18. The mechanism comprises two diametrically opposed jaws 28 (see FIG. 2). Each jaw 28 is connected to an actuating rod 29 of a pneumatic actuator 30 carried on the associated support 27. A radially extending rod 31 depends from each support 27 and guides a bush 32 carried on the associated jaw 28, to ensure that the jaw moves only in a radial direction relative to the machining axis 17.

Each jaw 28 is of a greater axial length than the combined axial lengths of the annulus 22 and the pad 24 and is arranged so that it overlies the annulus 22 and the pad 24 (see FIG. 1). Each jaw 28 is of a generally open U-shape with two side surfaces 33 interconnected by a base surface 34 (see FIG. 2). The surfaces 33, 34 are generally planar. The base surface 34 and, optionally the side surfaces 33, may be provided with rubber pads (not shown) to prevent marking of the piston 10. The inclinations of the side surfaces 32 are such that, when these surfaces are at the same radius from the machining axis 17 as the radius of the piston 10, they are substantially tangential to such a radius.

The actuators 30 are controlled by a pneumatic control system 36 which extends or retracts the actuating rods in unison so that the jaws, during and at the end of their movement, always have the same respective radial distance from the machining axis 17.

In use, the actuators 30 are operated by the control system 36 to retract fully the jaws 28. The headstock 18 and the tailstock 35 are separated. An annulus 22 which has the same diameter as the diameter of the piston 10 to be machined, is fixed on the mandrel 19. A pad 24 having a required axial length is fitted on the end surface 21 of the annulus 22. A pre-machined piston 10 is placed between the headstock 18 and the tailstock 35, with its axis roughly coaxial with the machining axis 17. This may be done by a robotic device. The headstock 18 and the tailstock 35 are then moved axially relatively to one another until they clamp the piston 10 lightly between them, such that the piston is still capable of limited radial movement. As will be appreciated, the engagement between the headstock 18 and the piston 10 is by engagement of the projections 25 on the pad 24 with the crown 11 of the piston 10.

The actuators 30 are then pneumatically actuated by the system 36 to move the jaws 28 radially towards the annulus 22 and the piston 10; the movement being in synchronism and the rods 31 ensuring that the jaws 28 move only radially.

The side surfaces 33 of the jaws 28 contact the datum surface 23 of the annulus 22 and also the outer surface 13 of the piston 10, by virtue of their elongate axial length. This causes the piston 10 to be moved radially so that its outer surface 13 is exactly aligned with the outer surface 23 of the annulus 22. In this position, of course, the axis of the piston 10 is coaxial with the machining axis 17 and thus the piston is correctly positioned.

The clamping pressure between the headstock 18 and the tailstock 35 is then increased to force the projections 25 into the crown 11 of the piston 10, so holding the piston 10 firmly between the headstock 18 and the tailstock 35. The results of this are as follows. First, the piston axis is correctly aligned with the machine axis 17. Secondly, the crown 11 is pressed up against the end surface of the pad 24 so ensuring that the piston is at the required datum axial position and, due to the alignment of the piston axis and the machining axis 17, that the beginning of the curved piston surface 13 is at a required radial position.

The jaws 28 are then fully retracted to allow the finishing tool to move into the datum position and finish machine the piston 10. To allow completely uninterrupted access, it may be arranged for the supports 27 to be swung out of the position shown in the accompanying drawings, so moving the actuators 30 and jaws 28 clear of the piston 10.

It will be appreciated that this device can be adapted to pistons of any diameter by changing the annulus 22 to an annulus of the necessary diameter and by changing the jaws 28, for which purpose the jaws may be demountable from the associated actuators 30. The datum axial position can be varied by altering the axial thickness of the pad 24, and for this purpose a series of pads of differing thickness may be provided.

The device described above with reference to the drawings allows very high machining rates and a very high degree of accuracy because the piston is machined in a single operation and is very accurately positioned. The whole operation can be computer-controlled so allowing a substantial increase in production rates. Pistons of any diameter can be handled in this way by suitable adjustment of the device.

While the above device has been described in relation to a piston, it will be appreciated that it may be used for any suitably sized cylindrical workpiece whose outer curved surface is to be machined. It can also be used for workpieces which do not have cylindrical surfaces, such as workpieces whose outer surfaces are of oval section or any other section. In this case, the datum surface is arranged at the required distance from the machining axis of at least a part of the outer surface of the workpiece and this part of the surface is aligned with the datum surface.

Of course, in any embodiment, the datum surface and the workpiece surface need not be aligned, in the sense of lying exactly the same distance from the machining axis. The jaws could be arranged with a step so that the workpiece surface is aligned at a fixed distance from the datum surface; the fixed distance and the datum surface distance from the machining axis together being the required distance of the workpiece surface from the machining axis.

I claim:

1. A device for setting up and holding a piston on a machining axis to allow machining of an outer surface thereof in a single operation, comprising:

a rotatable headstock assembly defining a machining axis, a mandrel included in the headstock assembly, a cylindrical outer surface provided on the mandrel coaxial with said machining axis, an annulus removably mounted on said cylindrical outer surface of said mandrel, a datum cylindrical surface formed on said annulus coaxial with said machining axis and having a diameter which is the same as the diameter of a piston to be machined, an end surface provided on said mandrel and lying in a plane normal to said machining axis, a pad removably connected to said mandrel end surface and having a predetermined axial length, said pad having a diameter which is less than the diameter of the piston to be machined, an end face provided on said pad and lying in a plane normal to the piston axis, a tailstock assembly rotatable about said machining axis, having means co-operating with said pad end face to clamp therebetween a piston to be machined, the clamping pressure being adjustable, jaws having inclined sides disposed on opposite sides of said machining axis, actuator means associated with each jaw for moving the associated jaw from a retracted inoperative position to an extended operative position in which said jaw sides engages said datum cylindrical surface of said annulus and said outer surface of the piston, clamped between the pad end face and co-operating means on the tailstock assembly for limited radial movement, to allow alignment of said outer surface of said piston blank with said datum cylindrical surface by the jaw sides before retraction of the jaws and increase of the clamping pressure to hold said piston blank in datum radial and axial positions for machining of said outer surface in a single operation.

2. A method of setting up and holding a piston blank on an axis to allow machining of an outer surface thereof in a single operation, the method comprising:

defining a machining axis with a rotatable headstock including a mandrel, selecting an annulus with an outer datum cylindrical surface having a diameter which is the same as the diameter of an outer surface of a piston to be machined, attaching said annulus to a cylindrical outer surface of said mandrel coaxial with said machining axis, said datum cylindrical surface being coaxial with the machining axis, selecting a pad having a diameter less than the diameter of said piston, and having a predetermined axial length between end faces thereof, attaching said pad to an end surface of said mandrel lying in a plane normal to said machining axis, said pad end faces lying in planes normal to said machining axis, providing a tailstock assembly having means rotatable about said machining axis and cooperating with said pad, clamping said piston between a pad end face and the tailstock assembly cooperating means, said piston blank being capable of limited radial movement, engaging said piston outer surface and said datum cylindrical surface of said annulus with actuator-driven jaws having inclined sides disposed on opposite sides of said machining axis, to align said piston outer surface with said datum cylindrical surface of said annulus, increasing the clamping pressure to hold said piston in datum radial and axial positions for machining of said outer surface in a single operation, and retracting the actuator-driven jaws prior to machining.

* * * * *